(12) United States Patent
Thibault (10) Patent No.: US 7,210,428 B2
(45) Date of Patent: May 1, 2007

(54) LIVESTOCK MANAGEMENT SYSTEM AND METHOD FOR SPLIT-WEIGHT FEEDING BASED ON MEDIAN WEIGHT OF HERD

(75) Inventor: Ronald M. Thibault, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 182 days.

(21) Appl. No.: 10/456,743

(22) Filed: Jun. 5, 2003

(65) Prior Publication Data

US 2003/0226522 A1    Dec. 11, 2003

Related U.S. Application Data

(60) Provisional application No. 60/393,175, filed on Jul. 1, 2002, provisional application No. 60/386,281, filed on Jun. 5, 2002.

(51) Int. Cl.
*A01K 29/00* (2006.01)
(52) U.S. Cl. ........................ 119/842; 119/712
(58) Field of Classification Search ............... 119/842, 119/51.02, 840, 14.01, 14.02, 14.03, 712, 119/14.08
See application file for complete search history.

(56) References Cited

U.S. PATENT DOCUMENTS

| 1,788,244 | A | * | 1/1931 | Larson | 119/840 |
| 3,545,407 | A | * | 12/1970 | Moore | 119/502 |
| 4,136,641 | A | * | 1/1979 | Hoffman | 119/840 |
| 4,280,448 | A | * | 7/1981 | Ostermann | 119/842 |
| 4,288,856 | A | * | 9/1981 | Linseth | 119/841 |
| 4,617,876 | A | * | 10/1986 | Hayes | 119/842 |
| 5,309,864 | A | * | 5/1994 | Harmsen et al. | 119/51.02 |

(Continued)

FOREIGN PATENT DOCUMENTS

DE    3701864 A1    8/1988

(Continued)

OTHER PUBLICATIONS

Neutkens, Debra, "Hands-Off Sorting," National Hog Farmer, Jun. 15, 2002, pp. 14-16.

(Continued)

*Primary Examiner*—Son T. Nguyen
(74) *Attorney, Agent, or Firm*—Jeffrey L. Thompson; Thompson & Thompson, P.A.

(57) ABSTRACT

A livestock management system is provided that sorts animals for split-weight feeding based on a calculated median weight of a herd. The system includes a pen area partitioned into a first feeding area containing at least a first feeder, a second feeding area containing at least a second feeder, and a common watering area containing at least one waterer. First and second one-way gates are respectively provided between the feeding areas and the watering area allowing animals to pass from the feeding areas into the watering area. A walk-through scale has an inlet open to the watering area, and first and second outlets open to the first and second feeding areas, respectively. The walk-through scale has a sort gate for selectively directing animals into the first and second feeding areas based on a comparison of a detected weight of the animal and a calculated median weight of the herd.

21 Claims, 7 Drawing Sheets

U.S. PATENT DOCUMENTS

| | | | | |
|---|---|---|---|---|
| 5,579,719 | A | * | 12/1996 | Hoff et al. ............... 119/51.02 |
| 5,673,647 | A | | 10/1997 | Pratt |
| 5,959,526 | A | * | 9/1999 | Tucker .................... 340/572.1 |
| 5,988,106 | A | | 11/1999 | van den Berg |
| 6,019,061 | A | * | 2/2000 | Schulte ................... 119/14.03 |
| 6,135,055 | A | * | 10/2000 | Pratt ....................... 119/51.02 |
| 6,239,711 | B1 | | 5/2001 | Downey et al. |
| 6,314,909 | B1 | * | 11/2001 | Horwood ................. 119/51.02 |
| 6,470,825 | B1 | * | 10/2002 | Johnson et al. .......... 119/51.02 |
| 6,526,919 | B1 | * | 3/2003 | Schick ....................... 119/840 |
| 2003/0192487 | A1 | * | 10/2003 | Zimmerman ................ 119/842 |

FOREIGN PATENT DOCUMENTS

| | | |
|---|---|---|
| DE | 200 18 646 U1 | 4/2001 |

OTHER PUBLICATIONS

Brumm, Mike, "Sorting for Size Usually Not Worth It," National Hog Farmer, Jun. 15, 2002, pp. 18-20.

Farmweld Inc., Teutopolis, IL, advertising brochure for "FAST, Farmweld Automatic Sorting Technology," obtained at 2002 World Pork Expo.

Downey, Peter et al., Canada, advertising brochure for "Weigh Easy Automatic Hog Sorting Systems," obtained at 2002 World Pork Expo.

Sierens Equipment Ltd., Canada, advertising brochure for "Auto-Sorter Scale," obtained at 2002 World Pork Expo.

K&L Technical Services Ltd., Canada, advertising brochure for "Super Sorter," obtained at 2002 World Pork Expo.

K&L Technical Services Ltd., Canada, information sheets for "Super Sorter," obtained at 2002 World Pork Expo.

Flintville Metals, LLC, advertising brochure for "'Automatic Sorting' Finisher Penning," obtained at 2002 World Pork Expo.

Schick Enterprises, Kutztown, PA, advertising brochure for "Sort-All, 'The Easy-Sort System,'" obtained at 2002 World Pork Expo.

* cited by examiner

LIVESTOCK MANAGEMENT SYSTEM AND METHOD FOR SPLIT-WEIGHT FEEDING BASED ON MEDIAN WEIGHT OF HERD

RELATED APPLICATIONS

This application claims priority of U.S. Provisional Application No. 60/386,281 filed on Jun. 5, 2002, and No. 60/393,175 filed on Jul. 1, 2002.

FIELD OF THE INVENTION

The present invention relates generally to livestock production management systems, and in particular, to systems and methods for feeding market animals in separate groups based on the detected weights of the animals.

BACKGROUND OF THE INVENTION

Meat packers and their customers are demanding the production and delivery of market animals with weights that must meet progressively tighter windows for acceptable weights. Marketing animals, whose weights fall outside the specified weight ranges, usually result in significant deductions from market prices for such underweight or overweight animals.

Simultaneously, producers are increasingly conscious that underfeeding or overfeeding not only hurts their bottom line profitability, but feeding a feed that is not optimum each phase of the growth cycle unnecessarily burdens them with waste nutrient disposal costs and regulatory review.

Historically pig producers selected animals for market by simple visual inspection, relying on pig judging skills to identify market animals. Such methods are neither sufficiently accurate nor reliably consistent for modern markets. The use of single-animal farm scales, such as the Osborne Industries ACCU-ARM® scale, is sufficiently accurate to select animals for market. Using such scales has been shown to amply reward the user with a profitable payback at market for both the cost of equipment and labor for weighing.

To manage feed, phase feeding is increasingly employed, changing feed composition to match growth utility at multiple intervals during the growth cycle. These changes are best accomplished with an accurate understanding of the daily weight distribution and its rate of change for the animals. Although visual inspection or fixed calendar-based growth curves have usually been the methods used to make phase feed changes, visual inspection is approximate at best, and growth curves do not take into account the effects of environmental temperatures or pen stocking densities which both affect actual rate of gain.

Although using scales to weigh market animals or measure weight distributions is clearly desirable, weighing one animal at a time requires substantial labor and time, two commodities that are often unavailable in modern finishing operations. Furthermore, weighing animals that fail to meet the marketing range always causes a temporary, but costly interruption to their normal growth. For phase feed changes, weighing of small samples of the pen is the only practical method, but is not really much more accurate than visual estimating. If large numbers of animals must be inspected, the use of single-animal scales is simply too slow to be practical.

The first step in automated weighing must be to spread the cost and equipment maintenance over a large number of animals. This consideration leads naturally to the conclusion that managing finishing pigs in large pens is highly desirable.

Other automated sorting systems have been developed and used in the past with only limited success. The "food court" sorting system essentially groups all of the feeders into a relatively small area of the finishing room. The remainder of the finishing room is reserved as a loafing area without feeders. Both the food court and the loafing areas are provided with water.

Several weeks prior to marketing with the food court system, a sorting scale is moved into position and pigs must enter the food court through a sorting scale in order to be fed and return to the loafing area via one-way gates. At some point, a sort weight or weight range is assigned to the sort scale and the food court is divided into a market animal pen and a reject pen for pigs outside the sort range. The reject pigs can return to the loafing area via a one-way gate, but the market animals are prohibited from remixing in the loafing area by locking the one-way exit gates. After about 24-hours, the market animals are loaded out and the pen is returned to normal operation. The sort off of market animals is repeated until all animals have been selected for specific markets or fed out to meet the target ranges set earlier.

The food court system has several distinct disadvantages. For example, because the food court provides both food and water in a very compact area, the dominant pigs in the group both have no incentive to leave and can easily control access to the feeders and intimidate less aggressive pigs. This type of dominant behavior is most easily seen in adult sows, but exists with adolescent pigs as well. The food court arrangement almost ensures a wider spread of weights in the group and a longer time to market with higher facilities utilization costs.

Moreover, the automatic market scale of the food court system is used in such a way that very accurate weights are required with pigs on one pass through the scale. The pigs must be accurately separated, weighed, and then released into the market pen. Moving across such a scale with multiple moving gates requires training. Training occurs because feed is the incentive. This means that feed restriction is a necessary consequence for this training, often in the final weeks prior to market when extending the market date is least affordable.

Automatic marketing scales and the food court system both combine to increase facilities utilization costs because increasing the number of "tail-enders" is a necessary outcome for this system.

Thus, there is a need in the industry for an improved livestock management system and method for split-weight feeding that solves the problems with the prior art described above.

SUMMARY OF THE INVENTION

The present invention provides a system that sorts animals into two or more separate pens for feeding based on a calculated median weight of the animals. The system includes a pen area partitioned into a first feeding area containing a first group of feeders, a second feeding area containing a second group of feeders, and a common watering area accessed by the animals in both the first and second feeding areas. First and second one-way gates are respectively provided between the feeding areas and the common watering area allowing animals to pass through only in a direction from the feeding areas into the watering area.

A walk-through scale provides a passageway from the common watering area back into the first and second feeding areas. The walk-through scale has an inlet open to the watering area, and first and second outlets open to the first and second feeding areas, respectively. The scale measures the weight of each animal as the animal leaves the watering area. A controller detects and stores the measured weight of each animal, calculates the median-weight of the animals in the herd, and determines whether the animal is above or below the median weight. The median weight is calculated by the controller from all the weights recorded each day, and is adjusted daily as the animals grow.

The controller activates the sort gate into a first position for guiding animals through the first outlet into the first feeding area when the detected weight is above the median weight. The controller activates the sort gate into a second position for guiding animals through the second outlet into the second feeding area when the detected weight is below the median weight. Thus, the heavy half of the animals are grouped in the first feeding area, and the light half of the animals are grouped in the second feeding area.

The heavyweight animals in the first feeding area are given a feed ration that maximizes return on gain. The lightweight animals in the second feeding area are given a high performance feed to accelerate gain and finish faster. As a result, the system limits the weight distribution spread of the animals in the herd and reduces sort losses at market.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A livestock management system and method according to preferred embodiments of the present invention will now be described with reference to FIGS. 1 to 7 of the accompanying drawings.

The livestock management system comprises a pen area 10 having a plurality of waterers 11, a first group of feeders 12, and a second group of feeders 13. The first group of feeders 12 is supplied with feed from at least a first bulk bin 14, and the second group of feeders 13 is supplied with feed from at least a second bulk bin 15. The feeders 12, 13 are preferably dry ad libitum feeders arranged for maximum access in the pen area 10. The separate bulk bins 14, 15 allow separate feed rations to be supplied to the first and second groups of feeders 12, 13.

The pen area 10 is partitioned into a first feeding area 16 containing the first group of feeders 12, a second feeding area 17 containing the second group of feeders 13, and a common watering area 18 containing the waterers 11. Partition gates 19–22 are used to partition the pen area 10.

A first one-way gate 23 is positioned in a first narrow passageway 24 between the first feeding area 16 and the common watering area 18. A second one-way gate 25 is positioned in a second narrow passageway 26 between the second feeding area 17 and the common watering area 18. A walk-through scale 27 has an inlet 28 open to the common watering area 18, a first outlet 29 open to the first feeding area 16, and a second outlet 30 open to the second feeding area 17.

Figure 1:
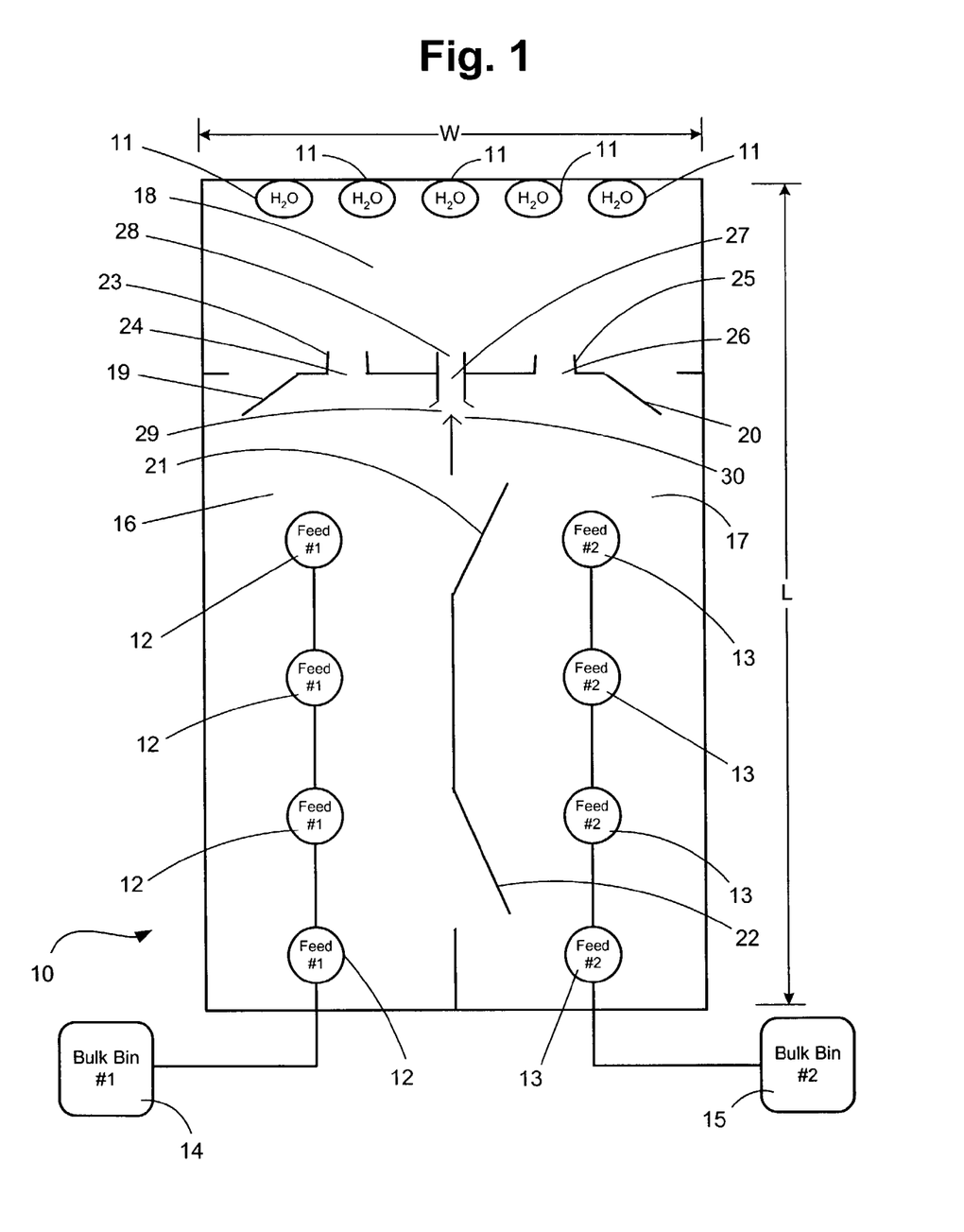
FIG. 1 is a diagrammatic plan view of a livestock penning system according to the present invention showing partition gates, one-way gates and a walk-through scale all open to allow animals to move freely about the entire pen.

FIG. 1 shows an initial configuration of the pen area 10 when animals are first stocked in the pen area 10. The animals are preferably moved into the common watering area 18 first so that they quickly learn where the water is located. In this initial configuration of the pen area 10, a first partition gate 19 is open to allow animals to roam freely between the first feeding area 16 and the common watering area 18. A second partition gate 20 is open to allow animals to roam freely between the second feeding area 17 and the common watering area 18. Third and fourth partition gates 21, 22 are open to allow animals to roam freely between the first and second feeding areas 16, 17.

The first and second one-way gates 23, 25 are in their open or inactive positions which allow animals to move freely in either direction through the first and second narrow passageways 24, 26. The walk-through scale 27 is also open to allow animals to move freely through either of the first or second outlets 29, 30. Thus, the animals are initially allowed to move freely about the entire pen area 10 for a period of time (e.g., a few weeks) allowing them to become accustomed to the pen area 10 with minimal stress. The feed ration in the first and second groups of feeders 12, 13 can be the same during this initial time period.

Figure 2:
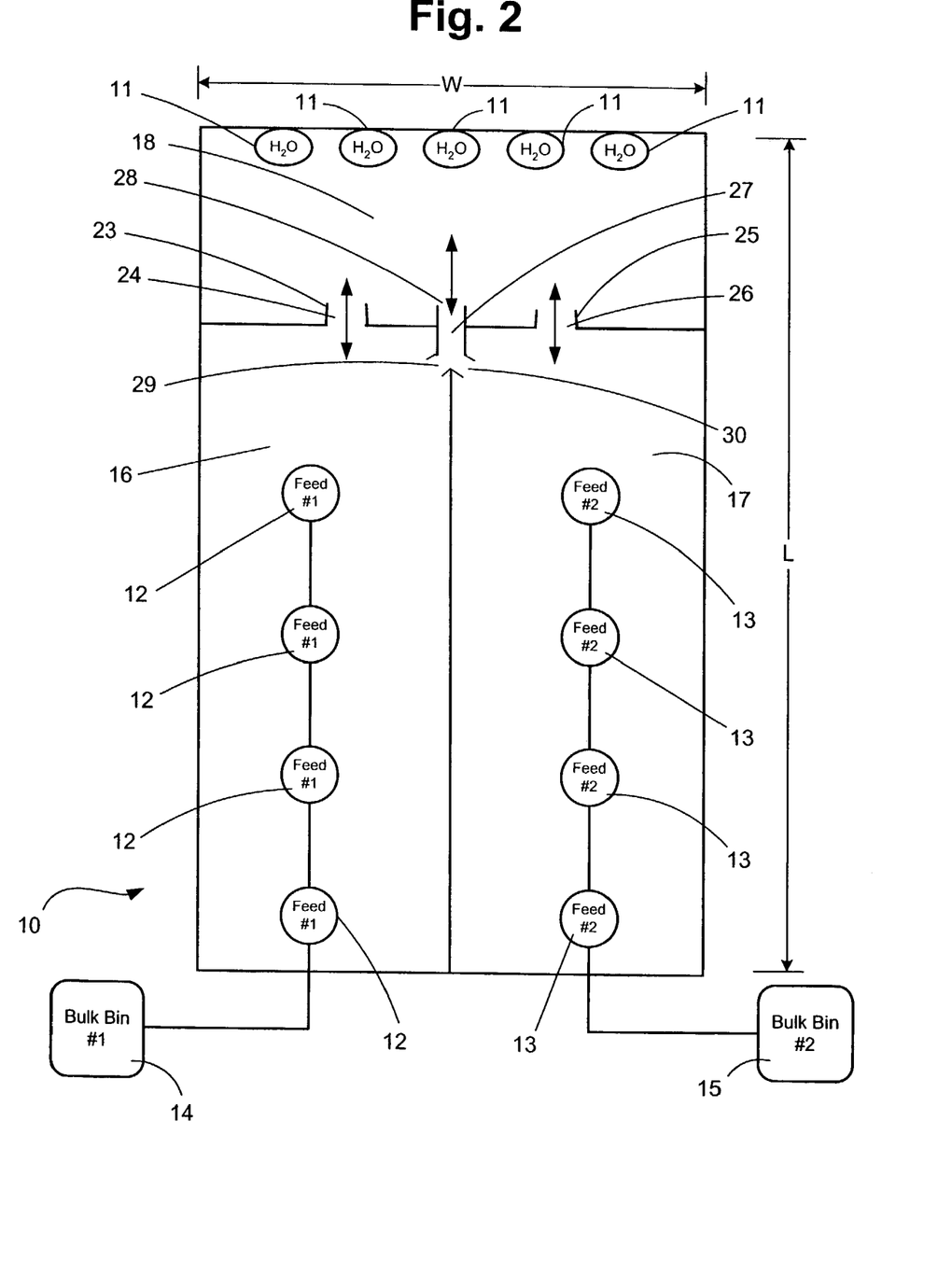
FIG. 2 is a diagrammatic plan view of the livestock penning system shown in FIG. 1 with the partition gates closed to limit movement of animals through the one-way gates and the walk-through scale.

After the animals become accustomed to the entire pen area 10, the first, second, third and fourth partition gates 19–22 are closed, as shown in FIG. 2. This limits movement of the animals so that they have to pass through the first and second narrow passageways 24, 26 and the walk-through scale 27 to move between the feeding areas 16, 17 and the common watering area 18. The first and second one-way gates 23, 25 and the walk-through scale 27 remain in their open or inactive positions for a few additional days until the animals become accustomed to moving through them.

Figure 3:
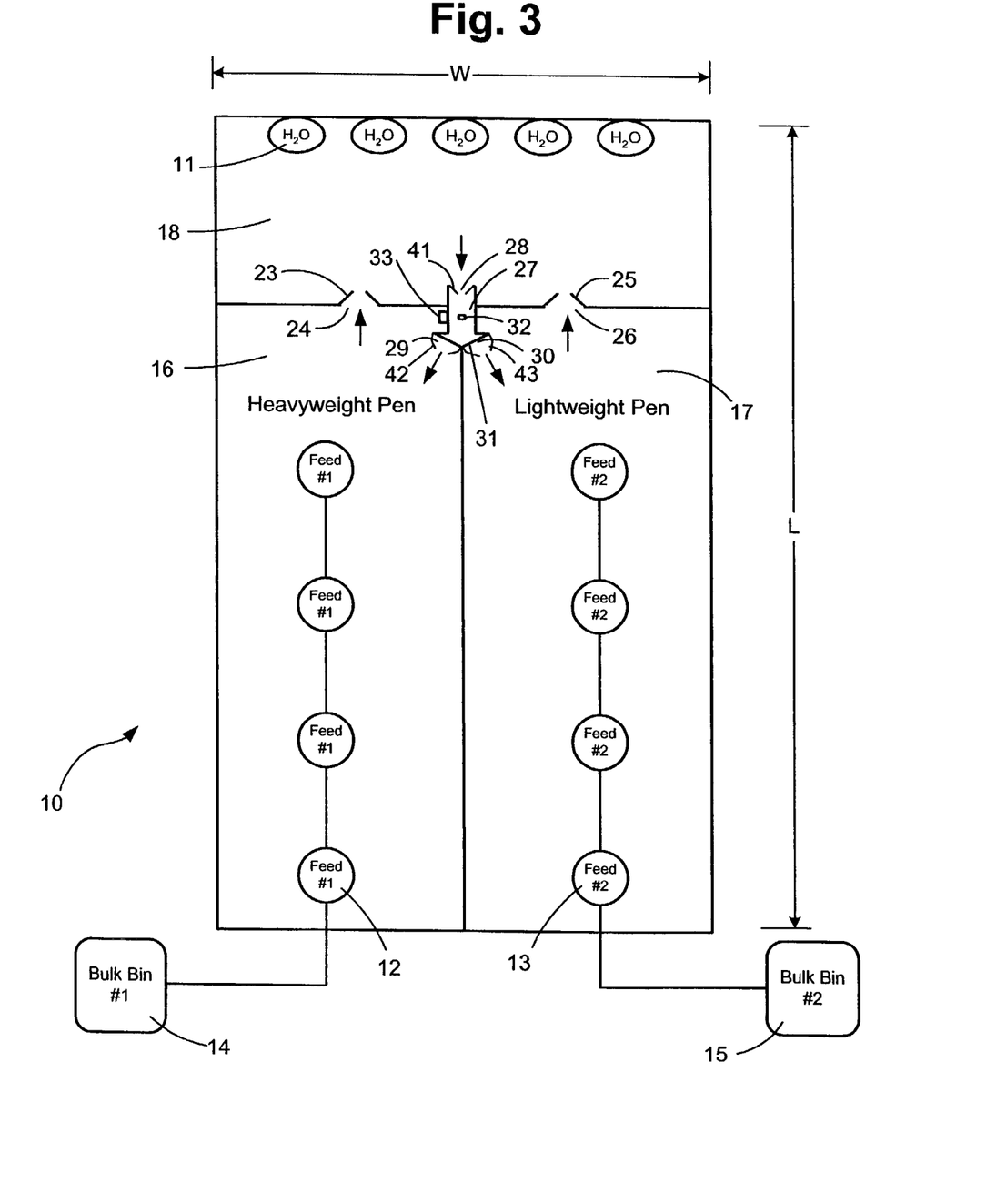
FIG. 3 is a diagrammatic plan view of the livestock penning system shown in FIG. 2 with the one-way gates and the walk-through scale activated to sort animals into a heavyweight pen and a lightweight pen for feeding.

The first and second one-way gates 23, 25 are then activated and the walk-through scale 27 is activated to restrict movement between the feeding areas 16, 17 and the common watering area 18 in the directions indicated by the arrows in FIG. 3. At this time, the walk-through scale 27 begins to sort heavyweight animals into the first feeding area 16 and lightweight animals into the second feeding area 17.

The first one-way gate 23, when activated, allows animals to move through the first passageway 24 from the first feeding area 16 into the common watering area 18, but not back into the first feeding area 16. Similarly, the second one-way gate 24, when activated, allows animals to move through the second passageway 26 from the second feeding area 17 into the common watering area 18, but not back into the second feeding area 17. The walk-through scale 27 has a sort gate 31 which is activated to move between a first position in which animals are directed through the first outlet 29 of the scale 27 into the first feeding area 16, and a second position in which animals are directed through the second outlet 30 of the scale 27 into the second feeding area 17.

When the starter or transition feed is exhausted from the first and second bulk bins 14, 15, a split-weight feeding strategy begins. The feed in the first bulk bin 14 is selected to provide an optimum feeding program for the heavyweight animals sorted into the first feeding area 16. Similarly, the feed in the second bulk bin 15 is selected to provide an optimum feeding program for the lightweight animals sorted into the second feeding area 17. The feeding program for the heavyweight animals can be optimized for best return on gain. The feeding program for the lightweight animals can be optimized for rate of gain to cut time to market and thereby improve utilization of the facilities. Growth boosting products, such as PAYLEAN® from Elanco Animal Health, can be used in the second feeding area 17 to help eliminate multiple sorts of the animals for market.

The walk-through scale 27 includes a load cell 32 that measures the weight of the animals each time they pass through the scale 27. The load cell 32 is preferably located at the top of the scale 27 so it stays clean and away from manure and debris that might interfere with its operation. The walk-through scale 27 is also equipped with a microprocessor-based controller 33 that rapidly detects and stores the weight of each animal based on input from the load cell 32 as the animal passes through the scale 27. A display screen is provided on the controller 33 to display weight information. Using the display screen and a touch button input, sorting decisions can be entered manually at the walk-through scale 27.

Figure 4:
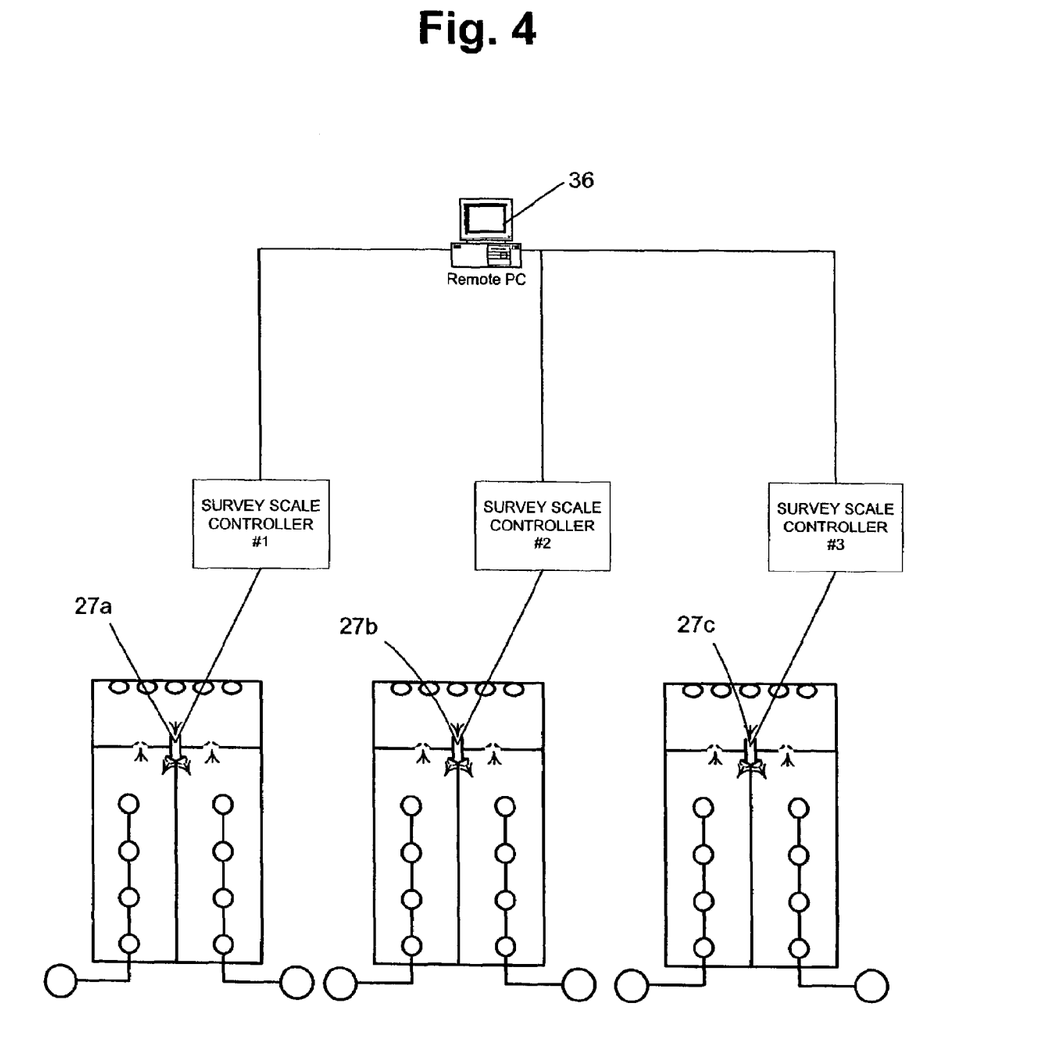
FIG. 4 shows a plurality of livestock penning systems according to the present invention linked together to a remote PC.

As shown in FIG. 4, a system of walk-through scales 27a–27c can be economically linked together to a remote PC 36. The PC 36 can be equipped with weight management software allowing it to graphically monitor weight distributions and pen median weights, and multiple parameters can be set at the PC 36 to execute management decisions using sort gates and spray markers at each scale 27a–27c.

The sort gate 31 is activated for movement between its first and second positions based on control signals received from the walk-through scale controller 33. In the preferred embodiment, the controller 33 calculates a median weight of the animals in the herd and uses the calculated median weight as a threshold sorting weight. As each animal passes through the walk-through scale 27, its weight is detected by the controller 33 and compared with the calculated median weight of the animals in the herd. If the animal is heavier than the median weight, the controller 33 causes the sort gate 31 to move to its first position for directing the animal into the first feeding area 16. If the animal is lighter than the median weight, the controller 33 causes the sort gate 31 to move to its second position for directing the animal into the second feeding area 17. Thus, the animals that weigh less than the median weight will be grouped into the second feeding area 17, and the animals that weight more than the median weight will be grouped into the first feeding area 16.

The controller 33 recalculates the median weight of the animals in the herd after a predetermined time interval. For example, the controller 33 can recalculate the median weight each day based on the detected and stored weights from the previous day. Alternatively, the controller 33 can continuously recalculate a median weight based on the detected and stored weights during the last 24 hours or other suitable time interval.

Figure 5:
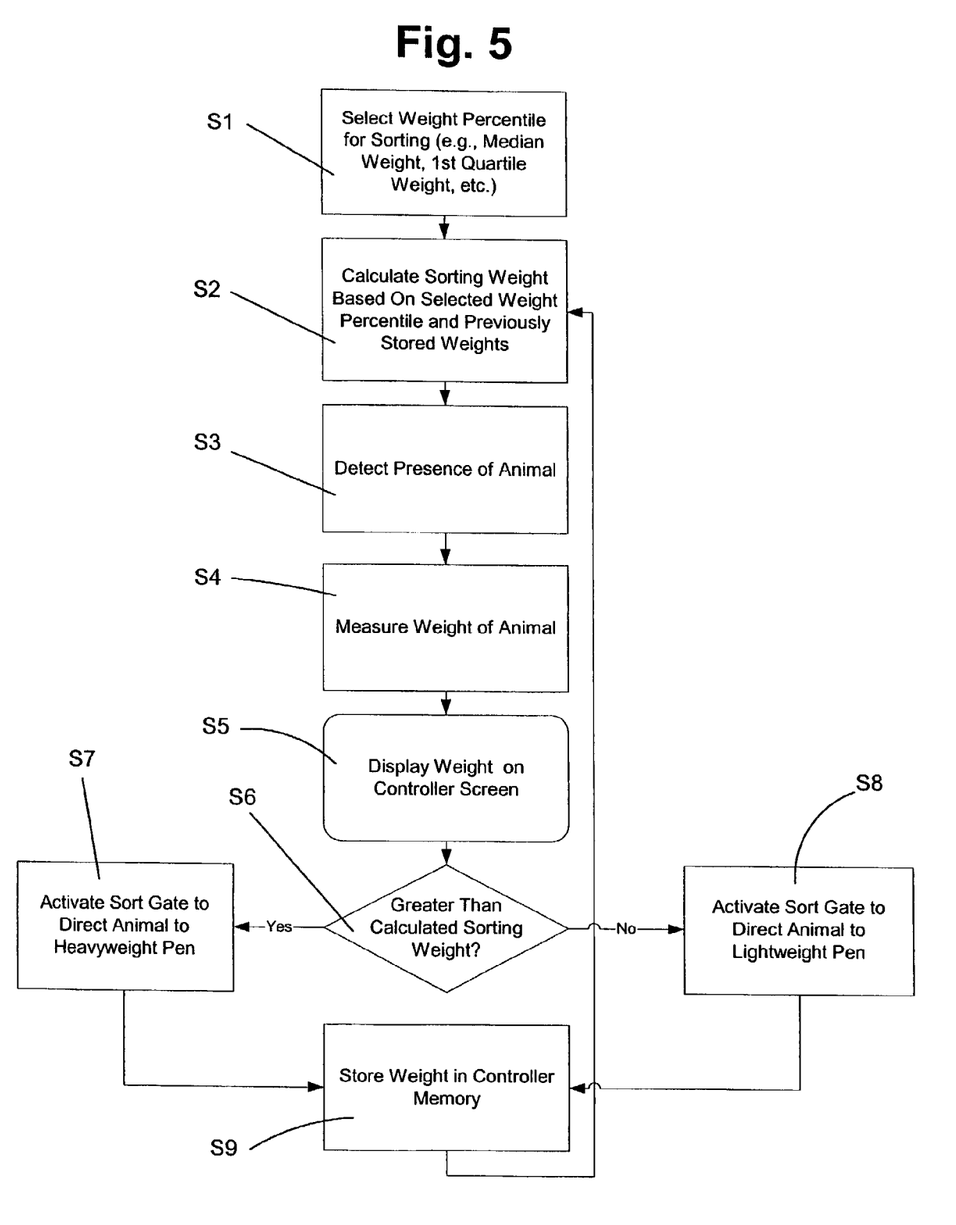
FIG. 5 is a flowchart showing the operation steps of a controller for the walk-through scale.

A flow chart showing the basic operation of the controller 33 is shown in FIG. 5. The first step S1 shown in the flow chart is selecting a "weight percentile" for sorting. In the preferred embodiment, the selected weight percentile is the median weight of the animals, as described above. However, it is contemplated that animals can also be sorted to direct only the lightest 33% or other desired portion of the animals into the second feeding area 17. In that case, the selected weight percentile for sorting can be set to calculate a threshold sorting weight different from the median weight.

The second step S2 shown in the flow chart is calculating a sorting weight based on the selected weight percentile and the previously stored weights in the controller 33. In an alternative embodiment, the sorting weight can be calculated by adding a predetermined offset weight (e.g., 10 lbs.) to the calculated median weight (or other percentile weight).

Once the sorting weight is calculated, the controller 33 will detect the presence of an animal on the scale 27 in step S3, measure the weight of the animal in step S4, display the weight in step S5, and then compare the weight to the calculated sorting weight in step S6. If the detected weight of the animal is greater than the calculated sorting weight, the controller 33 activates the sort gate 31 in step S7 to direct the animal into the heavyweight pen area 16. If the detected weight of the animal is less than the calculated sorting weight, the controller 33 activates the sort gate 31 in step S8 to direct the animal into the lightweight pen area 17. The weight is then stored in a memory of the controller 33 in step S9 and used in step S2 to update the calculated sorting weight for the next animal or for the following day.

In the preferred embodiment, the controller 33 calculates the median weight of the animals in the entire herd, as explained above, and also the median weights (referred to as the quartile weights) for each of the first and second feeding areas 16, 17 (i.e., the heavyweight and lightweight pens). Using these values, a more accurate timing of phase feed changes can be made for each of the feeding areas 16, 17, eliminating wasted nutrients.

The shape of the pen area 10 is preferably rectangular with a length L and a width W. For pigs, the pen area 10 should have a length-to-width ratio (L/W) that does not exceed about two. The first and second feeding areas 16, 17 preferably comprise about 80 to 85% of the total pen area 10, and the common watering area 18 preferably comprises about 15 to 20% of the total pen area 10. A space of about 8.0 square feet per pig is recommended, and up to about 500 head can be managed with each walk-through scale 27.

The system can incorporate radio frequency identification ("RFID") technology to identify and track the performance of individual animals. For example, an RFID ear tag can be attached to each animal to identify animals with superb or delayed growth. "Poor doers" can be quickly culled, saving feed and space. Accuracy of the calculated sorting weights can be improved with RFID by ensuring that each animal is counted only once per day by the controller 33 in calculating the median weight. The controller 33 can be programmed to track the individual growth curves of each animal and to signal when an animal is falling behind its expected rate of weight gain or failing to eat or drink. A marking device 37 can be provided with the walk-through scale 27 and activated to mark (e.g., by spray painting) animals that need attention.

Figure 6:
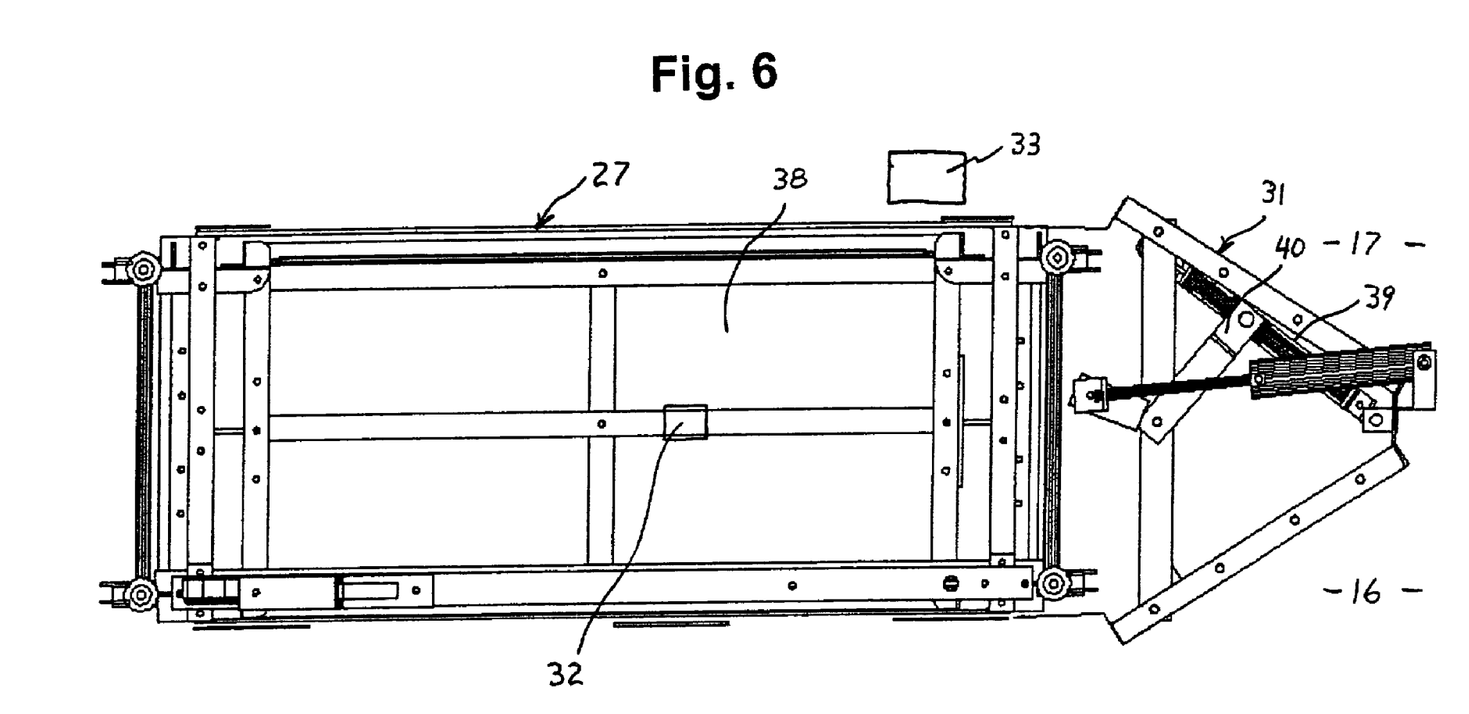
FIG. 6 is a plan view of the walk-through scale used in the present invention.

As shown in FIG. 6, the walk-through scale 27 used in the present invention has a platform 38 for animals to walk across or stand on. The sort gate 31 comprises a swinging gate panel 39 which is selectively swingable between a first position (shown in FIG. 6) in which an animal leaving the scale 27 is directed into the first feeding area 16, and a second position (not shown) in which the animal leaving the scale 27 is directed into the second feeding area 17. The sort gate 31 has a locking structure 40 that locks the swinging gate panel 39 in a selected one of the first and second positions. The sort gate 31 may have the same structure as the gate assembly described in the Applicant's copending Provisional Patent Application No. 60/386,281 filed on Jun. 5, 2002, which is incorporated herein by reference.

The sort gate 31 is moved between its first and second positions based on the determination made by the controller 33 as to whether or not each particular animal exceeds the calculated sorting weight. The heavier animals are automatically directed into the first feeding area 16, and the lighter animals are automatically directed into the second feeding area 17.

The walk-through scale 27 can be equipped with a one-way entry gate 41 at the inlet 28 that restricts entry onto the scale platform 38 to one animal at a time. The walk-through scale 27 can also include one-way exit gates 42, 43 positioned at each of the outlets 29, 30 to prevent entry of other animals into the scale 27 from the feeding areas 16, 17. However, it has been determined that the walk-through scale 27 can acquire an animal's weight so quickly that stopping movement of the animals through the scale 27 using entry and/or exit gates is generally not necessary. Without entry and exit gates, the walk-through scale 27 will appear to the animals as a clear, unobstructed passageway between the common watering area 18 and the first and second feeding areas 16, 17.

Occasionally more than one animal may enter the walk-through scale 27 simultaneously. In this case, the controller 33 can be programmed to immediately recognize the additional animal and reject the weight measurement.

As explained above, the management system of the present invention automatically divides animals, such as pigs, cattle, or other livestock, into two to four feeding groups as they grow, based on their rank in the weight distribution for the pen. This rank and weight distribution changes daily for each animal and for the pen group, respectively. The management system tracks these changes and ensures that each animal is always fed for its proper weight and rank in the group distribution. With controlled feeding throughout the finishing cycle, the system limits the spreading of the weight distribution, thereby minimizing sort losses at market and reducing the amount of market sorting required.

The management system of the present invention uses the movement of animals from water to feed to automatically divide the animals at the median or middle weight for the group. The median weight is determined from all the weights recorded each day (or other selected time interval) by the walk-through scale controller 33. This median weight is automatically adjusted daily (or at another predetermined time) as the animals grow. The actual measured growth for the group determines the median, not an arbitrary or static growth curve. The heavy half of the animals in the herd are automatically directed to a heavyweight feeding pen (i.e., the first feeding area 16), and the light half of the animals in the herd are automatically directed to a lightweight feeding pen (i.e., the second feeding area 17).

The management system of the present invention helps the manager feed the pen to reach market quicker at the exact weight that the packer demands. The weight distribution of the pen is known each day so that phase-feed changes are efficient, easy, and accurate. Lightweight animals can receive a high performance feed to accelerate gain and finish faster. Heavyweight animals can receive a feed that maximizes return on gain. Both feeds can be automatically phased to match growth and minimize wasted nutrients.

The management system of the present invention is not just a market-day automated sorter. It is a way to manage the feeding and production of market animals, such as pigs, cattle, and other livestock. In the present invention, all animals in a herd return each day to a common watering area 18 to drink. Each day the animals are resorted based on the median weight. If a heavy animal falls behind because of illness, environment, or genetics, it is automatically promoted to the lightweight side and a recovery feed. If the growth of a lightweight animal excels, it is automatically promoted to the heavyweight side and a more economical feed. No social problems arise, because all animals remain part of the larger group through earlier socialization and continued contact in the common watering area 18.

With the management system described above, feeders 12, 13 are distributed widely over about 80 to 85% of the pen area so dominant animals cannot control feed access. Since dominant animals tend to be the largest in the herd, the eating behavior of the lightweight animals with their own feeders is not inhibited.

The management system of the present invention can also be used to capture market weight animals immediately prior to shipping. This mode of the invention will be explained with reference to FIG. 7 of the drawings.

Figure 7:
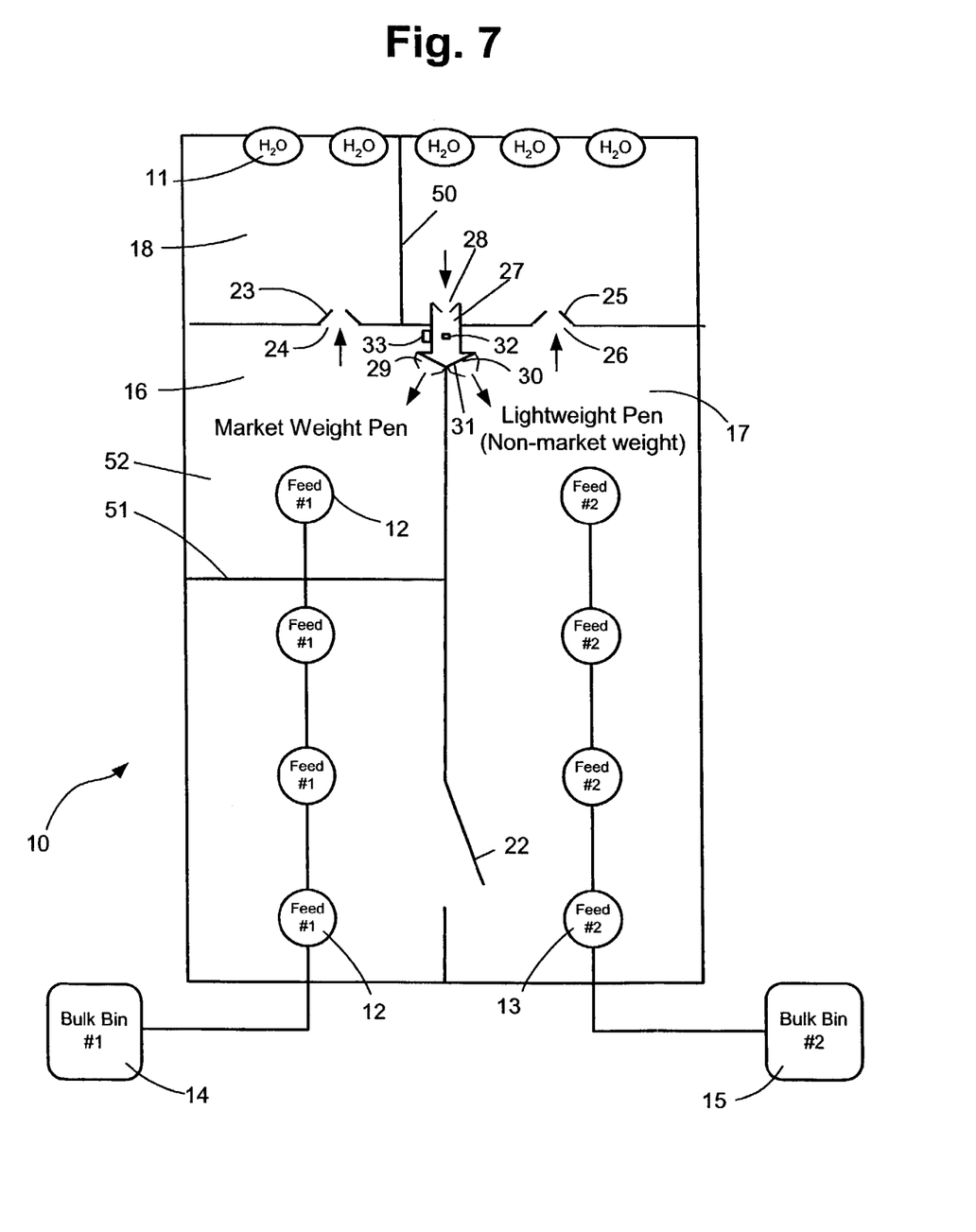
FIG. 7 is a diagrammatic plan view of the livestock penning system of the present invention with the heavyweight pen partitioned to capture market weight animals immediately prior to shipping.

The walk-through scale 27 can be set to detect when a selected percentage of animals (e.g., 5%) of the animal herd (e.g., 500 animals) first exceeds a desired market weight (250 lbs, for example, for pigs). By comparison of the market weight with the weight distribution for the pen, a marketing decision can be made. For example, if the upper quartile weight is 245 lbs and market groups of 125 pigs are desired, then at a rate of gain of 2 lbs/day, in about three days, one-fourth of the pen can be sorted and shipped to market.

To capture market weight animals (if less than one-half of the group is to be marketed), then swing gates can be used to form a marketing pen. A first set of swing gates 50 divide the water pen 18 between the heavy-side, one-way gate 23 and the entry to the walk-through scale 27. A second set of swing gates 51 divide the heavyweight pen 16 to form a market weight pen 52 for holding the market animals. This market weight pen 52 (part of the heavyweight pen 16 and the water pen 18) must include enough space for the anticipated number of animals to be marketed and be accessible to a loadout alley (not shown).

Next, all animals are temporarily excluded from the market weight pen 52 so that it can be filled only with market-weight animals. The swing gate 22 in the central partition between the heavyweight and lightweight pens 16, 17 is opened so light and heavy pigs have access to the water pen 18 through the lightweight pen 17. Since all animals are continuously commingled in the water pen 18 prior to this operation, no social problems are created by this action. The market weight animals are captured in the market weight pen 52 as they return to feed through the scale 27. All other animals return to the lightweight pen 17. After all the heavy animals are captured (e.g., after about 12 to 18 hours), the controller 33 shows the number of animals collected. While the market weight animals are collected, feed to any feeders 12 in the market weight pen 52 can be interrupted so that market animals go to market with an empty gut.

After the market weight animals are shipped, the gates 50, 51 are removed or replaced to their normal position and the management system is returned to its original configuration. After one day, the new weight distribution in the pen 10 is accurately remeasured and the weight of the median and chosen top percentile (e.g., 5%) of animals can be checked.

All animals can now be put on the "fast finish" feed, if desired, to accelerate the animals to market. Alternatively, another partial shipment can be selected as soon as the management system shows that a reasonable number of the animals exceed the target market weight.

It will be appreciated that certain features of the present invention described above can be changed without departing from the scope of the invention. For example, additional walk-through scales or sort gate assemblies could be incorporated into the system described above to allow animals to be sorted into more than two groups. The system can be extended to separate the top quarter, middle two quarters, and bottom quarter of animals into three pens for a three-way feeding program. Alternatively, a four-way sort into the four quartiles is also possible. The system can also be set to separate animals on the basis of one to four defined weight ranges, if desired.

The pen area 10 can be arranged in many equally acceptable ways, as long as water and feed are separated so that animals must pass from water to feed through the walk-through scale 27. Two or more one-way gates should be used to assure maximum access to water, and sufficient watering cups, nipples or trough space must be provided in the common watering area 18 to ensure easy access to water. Additional one-way gates can be added as insurance for large groups of animals. Some provision in the feeding areas 15, 16 for wetting and cooling the animals during summer heat is recommended to discourage animals from using the watering area 18 to cool themselves.

While the invention has been specifically described in connection with specific embodiments thereof, it is to be understood that this is by way of illustration and not of limitation, and the scope of the appended claims should be construed as broadly as the prior art will permit.

What is claimed is:

1. A method of managing livestock, comprising:
   individually weighing each animal in a herd;
   calculating a sorting weight based on a selected percentile weight of the animals in the herd during a first predetermined time interval;
   separating the animals into at least two groups based on the calculated sorting weight with animals above the calculated sorting weight comprising a first group which is placed in a first feeding area and animals below the calculated sorting weight comprising a second group which is placed in a second feeding area; and
   feeding the animals in said first group a different feed ration than the animals in said second group;
   wherein said step of calculating a sorting weight comprises the step of automatically updating a value of the calculated sorting weight using detected weights of the animals during a predetermined time interval following said first predetermined time interval.

2. The method of managing livestock according to claim 1, wherein said selected percentile weight is a median weight of the animals in the herd.

3. The method of managing livestock according to claim 2, wherein said step of separating the animals comprises comparing an individual weight of each animal with a previously calculated sorting weight of the animals in the herd and automatically sorting animals into said first and second feeding areas based on said comparison.

4. The method of managing livestock according to claim 1, further comprising the step of providing a common watering area adjacent said first and second feeding areas, said common watering area having livestock waterers shared by animals in both said first and second groups.

5. The method of managing livestock according to claim 4, wherein a walk-through sorting scale is placed between said common watering area and said first and second feeding areas, said sorting scale being operable to individually weigh each animal and then selectively direct the animal into said fist feeding area or said second feeding area based on a comparison of the individual weight of the animal with the calculated sorting weight of the animals in the herd.

6. The method of managing livestock according to claim 5, wherein a first one-way gate is positioned between said first feeding area and said common watering area, and a second one-way gate is positioned between said second feeding area and said common watering area, and further comprising the step of activating said first and second one-way gates to allow animals to pass through said first and second passageways wily in a direction from said first and second feeding areas into said common watering area.

7. The method of managing livestock according to claim 1, further comprising the step of partitioning a pen area into said first and second feeding areas and a common watering area adjacent said feeding areas, said common watering area comprising approximately 15 to 20% of said pen area and said first and second feeding areas comprising approximately 80 to 85% of said pen area.

8. The method of managing livestock according to claim 1, further comprising the step of using radio frequency identification to track and monitor the weight and feeding pattern of each individual animal.

9. The method of managing livestock according to claim 8, further comprising the step of automatically marking animals that fall behind a target minimum rate of weight gain.

10. The method of managing livestock according to claim 1, wherein the animals are pigs.

11. The method of managing livestock according to claim 1, wherein said step of calculating the sorting weight comprises automatically calculating the sorting weight using a microprocessor-based controller that receives weight data from said weighing step.

12. The method of managing livestock according to claim 1, wherein said step of feeding the animals in the first group a different feed ration than the animals in the second group comprises feeding the animals in the first group a first feed mixture and feeding the animals in the second group a second feed mixture, wherein said second feed mixture comprises feed ingredients for providing a faster rate of gain than said first feed mixture.

13. A method of managing livestock, comprising:
   individually weighing each animal in a herd;
   calculating a sorting weight based on a selected percentile weight of the animals in the herd;
   separating the animals into at least two groups based on the calculated sorting weight with animals above the calculated sorting weight comprising a first group which is placed in a first feeding area and animals below the calculated sorting weight comprising a second group which is placed in a second feeding area; and
   feeding the animals in said first group a different feed ration than the animals in said second group;
   wherein said step of calculating the sorting weight comprises adding or subtracting a predetermined offset weight to the selected percentile weight.

14. A method of managing livestock, comprising:
   collecting multiple weighings of animals in a herd as the animals move between watering and feeding areas;

calculating a sorting weight based on said multiple weighings collected during a first predetermined time interval;

sorting the animals into at least two groups based on the calculated sorting weight with animals above the calculated sorting weight comprising a first group which is placed in a first feeding area and animals below the calculated sorting weight comprising a second group which is placed in a second feeding area;

feeding the animals in said first group a different feed ration than the animals in said second group;

recalculating new sorting weights periodically based on multiple weighings collected during a predetermined time interval following said first predetermined time interval; and resorting the animals into said at least two groups based on the recalculated sorting weights.

15. The method of managing livestock according to claim 14, wherein said sorting weights arc calculated by determining a selected percentile weight of the animals in the herd.

16. The method of managing livestock according to claim 15, wherein said selected percentile weight is a median weight of the animals in the herd.

17. The method of managing livestock according to claim 14, wherein said step of calculating the sorting weight comprises automatically calculating the sorting weight using a microprocessor-based controller that receives weight data from said weighing step.

18. The method of managing livestock according to claim 14, wherein said step of feeding the animals in the first group a different feed ration than the animals in the second group comprises feeding the animals in the first group a first feed mixture and feeding the animals in the second group a second feed mixture, wherein said second feed mixture comprises feed ingredients for providing a faster rate of gain than said first feed mixture.

19. A method of managing livestock using split-weight feeding, comprising:

providing a pen layout having a watering area, first and second feeding areas, and a sorting scale positioned in a path between the watering area and the feeding areas;

automatically weighing animals and storing their weights in a controller associated with the sorting scale as the animals move across the scale between the watering and feeding areas;

calculating a sorting weight based on the weights stored in the controller during a first predetermined time interval;

automatically sorting the animals based on the calculated sorting weight so that animals having a weight above the calculated sorting weight are directed from the sorting scale into the first feeding area and animals having a weight below the calculated sorting weight are directed from the sorting scale into the second feeding area; and automatically recalculating the sorting weight based on the weights stored in the controller during predetermined time intervals following said first predetermined time interval so that the sorting weight is automatically changed periodically as the weight of the animals changes.

20. The method of managing livestock according to claim 19, further comprising the step of feeding the animals in the first feeding area a first feed mixture and feeding the animals in the second feeding area a second feed mixture having a different composition than said first feed mixture, wherein said second feed mixture comprises feed ingredients for providing a faster rate of gain than said first feed mixture.

21. The method of managing livestock according to claim 19, wherein said sorting weights are calculated by determining a selected percentile weight of the animals in the herd.

\* \* \* \* \*